United States Patent
Lynch

(10) Patent No.: US 8,565,731 B2
(45) Date of Patent: Oct. 22, 2013

(54) MISSED COMMUNICATION HANDLING

(75) Inventor: Stephen Brian Lynch, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 268 days.

(21) Appl. No.: 12/571,034

(22) Filed: Sep. 30, 2009

(65) Prior Publication Data
US 2011/0076989 A1 Mar. 31, 2011

(51) Int. Cl.
H04M 1/725 (2006.01)
H04M 1/663 (2006.01)
H04M 3/42 (2006.01)
H04M 1/00 (2006.01)
H04W 4/00 (2009.01)
H04B 1/38 (2006.01)

(52) U.S. Cl.
USPC .............. 455/412.2; 455/412.1; 455/414.1; 455/466; 455/567

(58) Field of Classification Search
USPC .............. 455/412.1, 412.2, 567, 414.1; 379/88.11–88.19
See application file for complete search history.

(56) References Cited

U.S. PATENT DOCUMENTS

| | | | |
|---|---|---|---|
| 6,246,889 B1 | 6/2001 | Boltz et al. | |
| 6,393,272 B1 | 5/2002 | Cannon et al. | |
| 6,438,216 B1 | 8/2002 | Aktas | |
| 6,728,349 B2 * | 4/2004 | Chang et al. | 379/93.23 |
| 6,760,581 B2 | 7/2004 | Dutta | |
| 6,842,622 B2 * | 1/2005 | Peters et al. | 455/458 |
| 6,937,868 B2 | 8/2005 | Himmel et al. | |
| 7,133,503 B2 | 11/2006 | Revisky et al. | |
| 7,190,351 B1 * | 3/2007 | Goren | 345/173 |
| 7,231,232 B2 | 6/2007 | Osann, Jr. | |
| 7,233,229 B2 * | 6/2007 | Stroupe et al. | 340/309.7 |
| 7,315,614 B2 * | 1/2008 | Bedingfield et al. | 379/142.07 |
| 7,362,854 B2 * | 4/2008 | Mcknight | 379/210.01 |
| 7,587,032 B1 | 9/2009 | de Waal | |
| 7,630,724 B2 | 12/2009 | Beyer, Jr. et al. | |
| 7,653,380 B2 | 1/2010 | Graefen | |
| 7,756,531 B2 * | 7/2010 | Aminzadeh | 455/456.4 |

(Continued)

FOREIGN PATENT DOCUMENTS

| | | |
|---|---|---|
| EP | 1071295 | 1/2001 |
| EP | 1 296 501 A1 | 3/2003 |

(Continued)

OTHER PUBLICATIONS

Adolfsson, Marcus, Palm Reveals Treo 700p Smartphone, treocentral.com, May 15, 2006.*

(Continued)

*Primary Examiner* — Dwayne Bost
*Assistant Examiner* — Larry Sternbane
(74) *Attorney, Agent, or Firm* — Meyertons, Hood, Kivlin, Kowert & Goetzel, PC

(57) ABSTRACT

Systems, methods and devices for missed call handling are provided. In particular there is provided a method for providing missed communication reminders. The method includes receiving an electronic communication and determining, by an electronic device, that the electronic communication was not acknowledged. In response to determining that the electronic communication was not acknowledged, a missed communication reminder is created and scheduled to be actuated automatically at a certain time. The missed communication reminder is stored in an electronic storage medium associated with the electronic device. Upon reaching the certain time, the missed communication reminder is actuated through an output apparatus in communication with the electronic device.

15 Claims, 10 Drawing Sheets

(56) References Cited

U.S. PATENT DOCUMENTS

| | | | |
|---|---|---|---|
| 8,126,437 B1* | 2/2012 | Major et al. | 455/413 |
| 2001/0029194 A1* | 10/2001 | Ketola et al. | 455/567 |
| 2002/0137503 A1 | 9/2002 | Roderique | |
| 2002/0142756 A1 | 10/2002 | Rutledge et al. | |
| 2003/0054865 A1 | 3/2003 | Byers et al. | |
| 2004/0196964 A1 | 10/2004 | Bluvband | |
| 2004/0203632 A1 | 10/2004 | Schaaf | |
| 2004/0264653 A1 | 12/2004 | Revisky et al. | |
| 2005/0008129 A1 | 1/2005 | Wullert | |
| 2005/0041793 A1* | 2/2005 | Fulton et al. | 379/211.01 |
| 2005/0117714 A1 | 6/2005 | Chingon et al. | |
| 2005/0227740 A1 | 10/2005 | Orbach | |
| 2006/0229107 A1* | 10/2006 | Cho et al. | 455/566 |
| 2007/0032225 A1* | 2/2007 | Konicek et al. | 455/417 |
| 2008/0039152 A1* | 2/2008 | Arisawa | 455/567 |
| 2008/0259742 A1 | 10/2008 | Tadanori | |
| 2009/0022294 A1 | 1/2009 | Goldstein et al. | |
| 2009/0028179 A1 | 1/2009 | Albal | |
| 2009/0221274 A1 | 9/2009 | Venkatakrishnan et al. | |
| 2009/0239509 A1 | 9/2009 | Sennett et al. | |
| 2010/0159964 A1* | 6/2010 | Ferro | 455/466 |
| 2010/0203904 A1 | 8/2010 | Khokhlov | |
| 2010/0297981 A1 | 11/2010 | Ballantyne et al. | |
| 2010/0330964 A1 | 12/2010 | Chen et al. | |
| 2011/0085549 A1 | 4/2011 | DiMambro | |
| 2011/0111735 A1 | 5/2011 | Pietrow | |
| 2011/0310892 A1 | 12/2011 | DiMambro | |
| 2012/0149308 A1 | 6/2012 | Rothkopf | |
| 2012/0184325 A1 | 7/2012 | Hsieh | |

FOREIGN PATENT DOCUMENTS

| | | |
|---|---|---|
| EP | 2148531 | 1/2010 |
| WO | 99/31909 A1 | 6/1999 |
| WO | 2009/153537 A1 | 12/2009 |

OTHER PUBLICATIONS

Evans, Joes, Review of Samsung Instinct, Geek.com, Jul. 8, 2008.*
Non-Final Office Action in related U.S. Appl. No. 12/613,646, notification date Dec. 20, 2012, pp. 1-25.
Non-Final Office Action in related U.S. Appl. No. 13/529,938, notification date Dec. 14, 2012, pp. 1-12.
International Search Report and Written Opinion in related Application No. PCT/US2010/055504, mailed Jun. 9, 2011, pp. 1-18.

* cited by examiner

MISSED COMMUNICATION HANDLING

TECHNICAL FIELD

The present application relates generally to communications, and more particularly to handling missed communications.

BACKGROUND

Communication systems have progressively become more sophisticated, offering a greater variety of communication modes and communication media with increasingly more functionality. Among the various communication options available are land line telephonic communications, wireless telephonic communications, Internet Protocol (IP) telephony, video conferencing, email, short message service (SMS), multi-media message service (MMS), and so forth. Despite the wide variety of communication options, occasionally a user may be unable or unwilling to answer or acknowledge a communication at the time it is received. For example, phone calls received during meetings, classroom lectures and/or other conversations frequently are unanswered.

SUMMARY

Certain embodiments may take the form of a communication device configured to managed missed calls and related methods. For example, in one embodiment, a method for providing missed communication reminders is provided. The method includes receiving an electronic communication and determining, by an electronic device, that the electronic communication was not acknowledged. In response to determining that the electronic communication was not acknowledged, a missed communication reminder is created and scheduled to be actuated automatically at a certain time. The missed communication reminder is stored in an electronic storage medium associated with the electronic device. Upon reaching the certain time, the missed communication reminder is actuated through an output apparatus in communication with the electronic device.

In accordance with another embodiment, there is provided an electronic communication device that includes a processor and a memory coupled to the processor. The memory stores operating instructions for the electronic communication device. A plurality of I/O devices are coupled to the processor and include: at least one device configured to receive and transmit electronic communications, at least one device for receiving user input, and at least one device for providing output to a user. The electronic communication device is configured to determine when a communication is not acknowledged and store information related to the communication in the memory of the electronic communication device, the information comprising date, time and origin of the communication. Additionally, the communication device is configured to set a reminder comprising the information related to the communication, the setting of reminder comprising setting a time for actuation of the reminder.

In accordance with yet another embodiment, there is provided a method of operating a communications network configured to communicatively couple a plurality of communication devices together. The method includes determining by an electronic device when an electronic communication is not acknowledged by a destination communication device. In response to determining that the electronic communication was not acknowledged, the method includes determining the origin of the missed communication and sending a text message to the origin of the missed communication. Additionally, a time-based reminder is set for the destination communication device to, the reminder including the time, date and origin of the missed communication. The time-based reminder is configured to generate an output in response to reaching a set time.

DRAWINGS

FIGS. 6-12 illustrate example screen shots of a communication device that correlate to the flowchart of FIG. 5

DETAILED DESCRIPTION

Figure 1:
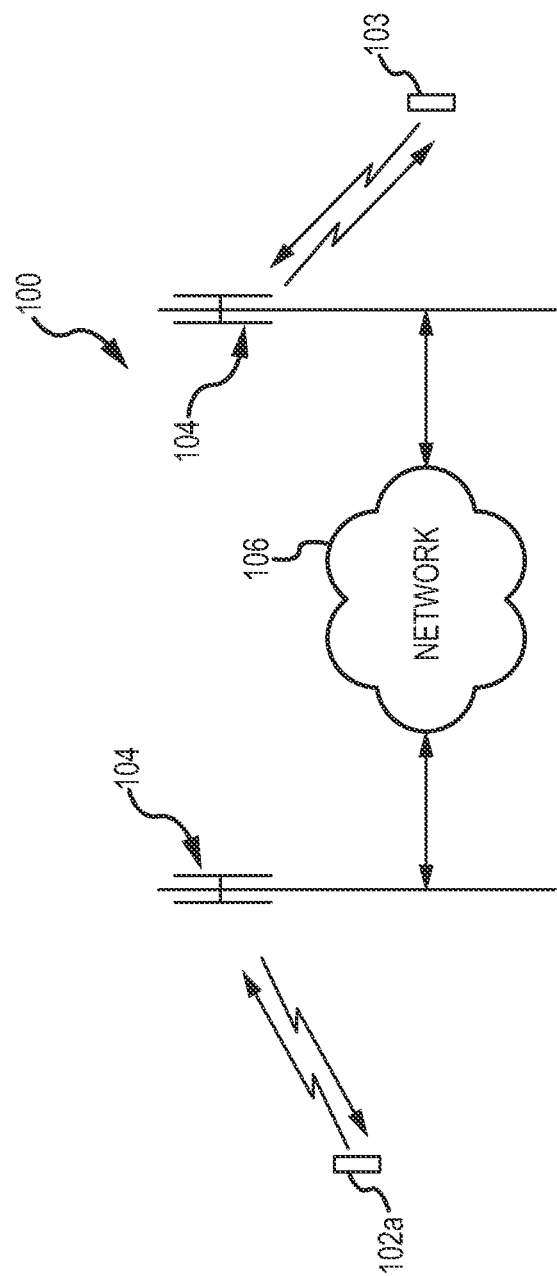
FIG. 1 illustrates a simplified communications system.

Generally, embodiments described herein may provide systems, methods, apparatuses and so forth related to receiving a communication and scheduling a return communication. Such scheduling may take place only if the communication is not acknowledged by the recipient at the time the communication is received. For example, if the recipient misses or ignores the communication, an embodiment may note the communication and/or its sender and schedule a time to return, read, listen to, or otherwise reply to the communication.

The time scheduled may be automatically determined by an electronic device, such as a communications device, or it may be user-selected. Further, a user may choose a particular time or block of time in which all reminders regarding a communication, as well as replies to the communication, are to take place. In such a case, the embodiment may use this time block of time in its scheduling.

When a communication is missed, an embodiment may store information such as a time, date, origin of the communication and/or other information related to the missed communication. An indication of the missed communication may be provided and may include the date and time of the missed communication as well as the origin of the missed communication, e.g., a phone number and name, among other things. Additionally or alternatively, a response to the communication may automatically be provided. For example, if a phone call is missed, an automated text message may be sent to the caller indicating that the call will be returned.

Additionally or alternatively, a user may be prompted to indicate whether a reminder should be set or to ignore the communication. The user may then be prompted to set the parameters of the reminder which may include setting a date and time or a particular amount of time to lapse, for example. In other embodiments, a reminder may automatically be set to activate at a certain day and time or after a set amount of time has lapsed. In some embodiments, the reminder may be set for select communications or select origins of communications. For example, a reminder may automatically be set for calls or emails from numbers and/or email addresses in a contacts listing or phone book of a communication device.

In one embodiment, when a communication is missed, a communication device may be configured to set a meeting time or allow a user to suggest a meeting time with the initiator of the missed communication. For example, a user may set a time and date for communicating with the initiator of the missed communication. A calendar event or invite may be sent to the initiator and the initiator may accept or reject the invite or suggest a different time and/or date. When a mutually agreeable time and date are set (i.e., when an invitation is accepted), a calendar alarm or reminder may be set for one or both of the initiator and the user that missed the call.

When a reminder time is reached, an embodiment may activate an alarm to notify a user. The alarm may be any suitable indictor including audible, haptic, and/or visual indicators used to get the attention of a user. A user may respond to the alarm by canceling the alarm, resetting the alarm, and/or following-up on the missed communication. Following-up on the missed communication may include, in one embodiment, reading a received email, for example. In other embodiments, the user may return the missed communication. In such embodiments, a user may simply select an option to return the communication and a communication device may initiate the communication using information collected from the missed communication.

FIG. 1 illustrates a simplified communications network 100. As can be seen, the communications network is configured to enable communications between communications devices 102 and 103. The communication devices 102 and 103 are wireless communication devices configured to wirelessly transmit data to and receive data from antennas 104. The antennas 104 may route the data via a network 106 which may include wireless, wired and/or fiber optic transmission pathways, filters and/or amplifiers. Additionally, the network 106 may include computer systems for storing and/or processing the data communicated between the devices 102 and 103.

It should be appreciated that although the communications network 100 and the communication devices 102 and 103 are illustrated as being configured to operate in a wireless network, in some embodiments communication devices that are not wireless devices may be implemented. Indeed, any device and or network configured to transmit and receive electronic communications may fall within the scope of this disclosure. In particular, other embodiments may include communications networks and devices configured for other modes of communications including landline, cable, or satellite communications, for example. Indeed, in some embodiments, the both wired and wireless networks and devices may be used for communications between communication devices.

The communications network 100 and devices 102 and 103 may be configured to support one or more different modes of communications. For example, the network 100 and devices 102 and 103 be may be configured to support short message service (SMS), enhanced message service (EMS), multi-media message service (MMS), emails, etc., as well as telephone calls, video calls, or any other form of electronic communication.

Figure 2:
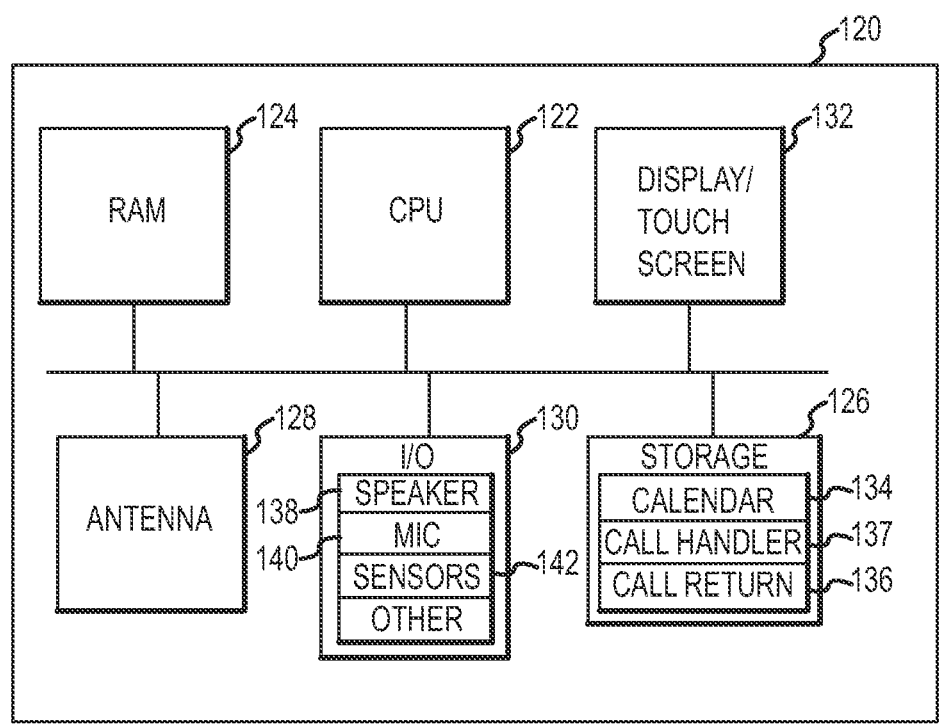
FIG. 2 is a simplified block diagram of a communication device of FIG. 1.

The network 100 and/or one or more of the communication devices 102 and 103 may be configured to provide reminders for missed communications. FIG. 2 illustrates a block diagram of the communication device 102 that may be used to provide missed call reminder functionality in accordance with the present disclosure. The communication device 102 includes a processor 122, a random access memory (RAM) 124, a digital storage device 126, an antenna 128, I/O devices 130, and a display 132. The CPU 122 may be any suitable processor for communication devices. The RAM 124 may be any suitable random access memory such as dynamic RAM, static RAM, dynamic RAM, etc., and may be configured to function as execution memory. That is the RAM 124 is coupled to the CPU 122 and configured to provide relatively quick access to data and programs that are currently being processed or run by the CPU 122 to the CPU 122.

The digital storage device 126 may be a hard disk drive, a solid state drive, flash memory, or other suitable digital memory device. In some embodiments, the communication device 102 may be configured to receive portable digital storage devices (not shown) such as micro flash drives, and the like. The digital storage device 126 may store programs and applications executable by the CPU 122 to provide functionality to the device 120. For example, the storage device 126 may store a calendar application 134, and a call return program 136.

In some embodiments, the call return program 136 may be integrated within a call handler program 137 as a sub-routine. Generally, the call handler program may manage incoming and outgoing calls and may be configured to receive and store data related to such calls, including time, date, destination and/or origin information. The call return program 136 and the calendar application 134 may be configured to provide data to each other in a manner to facilitate the call return program 136 providing reminders to a user. Specifically, the call return program 136 may be configured to place items or tasks into the calendar application 134. In return, the calendar program may be configured to provide alerts or reminders back to the call return program 136 to facilitate indicating when the time to display the reminder is reached, or to display a list of reminders if the calendar program or call return program are accessed by a user prior to such time. In other embodiments, the calendar application 134 may generate the output indicating that an event has occurred.

The antenna 128 may represent one or more wireless communication antennas such as antennas for cellular communications, Bluetooth communications, and WiFi communications, for example. In some embodiments, the antenna 128 may be configured for short range wireless communications at 2.4 Ghz, 5.8 Ghz, or other such frequency band and the communication device 102 may be configured to operate in conjunction with a base (not shown). In yet other embodiments (not shown), the communication device 102 may be communicatively coupled into a network via a wire, Ethernet cable, fiber optic cable, or etc., and, thus, not configured for wireless communications. It should be appreciated that processing may be performed remote from a receiver handset of the communication device 102. For example, the processing may be performed at a base station (not shown) or at a remote location (not shown) within a telephone network to which the receiver handset is coupled.

The communication device 102 includes a variety of I/O devices 130 to allow a user to interact with the device 102 and to allow the device 102 to receive and transmit data. To enable the communication device 102 to operate as a telephone, a speaker 138 and a microphone 140 are provided. Additionally, input devices such as of push buttons, a touch sensitive display, a keyboard, a proximity sensor, a mouse, and a trackpad may provided and output devices such as the display 132 and/or haptic actuators, such as vibration module, for example. In some embodiments, various sensors 142 may be provided to allow for specific functionality and/or particular user input. For example, in one embodiment, proximity sensors may be provided to determine when an object, such as a user's finger, is near a particular surface of the device 120. Other I/O devices may also be provided, such as function buttons, keyboard, scroll wheel, and so on. Additionally, in some embodiments the display 132 may be configured as a touch screen, such that a user may provide input to the communication device 102 by touching a display screen and/or icons shown on the display 132.

It should be appreciated that the communication device 102 and the various components and features illustrated in FIG. 2 are merely exemplary. Other embodiments may include more or fewer features. Indeed, embodiments may include any device suitable for electronic communications including telephones, desktop and notebook computing devices configured for Voice over Internet Protocol (VoIP) communications or other network communications, videophones, cellular phones, personal digital assistants, smartphones, etc., for example.

Figure 3:
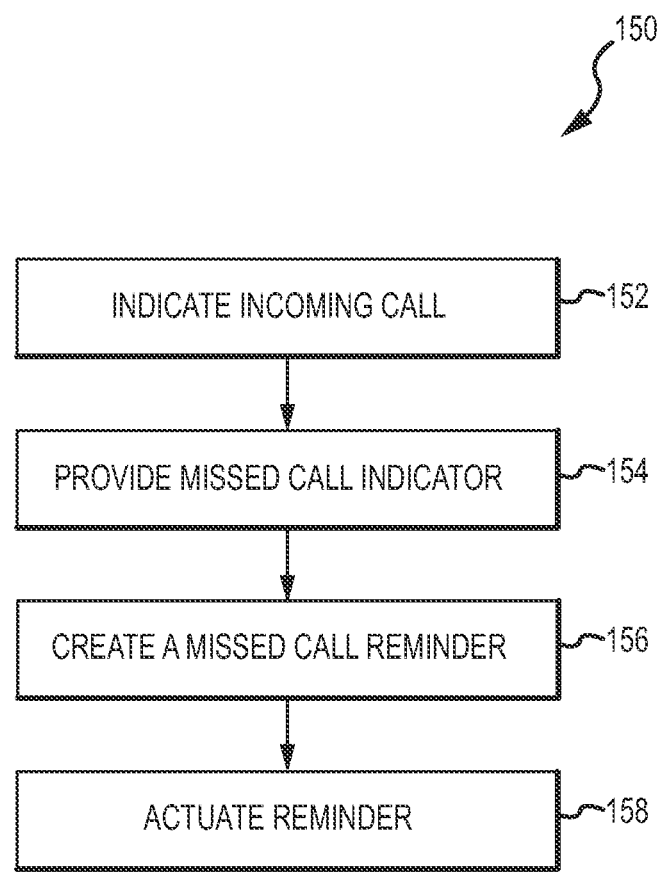
FIG. 3 is a simplified flowchart for handling missed calls.

The device 102 may be configured to handle missed communications. Generally, one example method 150 of an embodiment for handling missed communications is illustrated in the flowchart of FIG. 3. The method may be understood as representing a missed communication from device 102 to device 103. For the sake of simplicity, the method 150 refers to a "missed call." However, it should be understood that the use of the term "call" may refer to forms of communication in addition to telephone or voice based calls including text messages, emails, video calls, etc.

The method 150 includes the communication device 102 indicating an incoming call, as indicated at block 152, and providing a missed call indicator, as indicated at block 154. Generally, the indication of an incoming call and a missed call may include the device 102 providing a visual, audible, or haptic indication via the display 132, the speaker 138 and/or haptic actuators. For example, the missed call indicator may be a passive visual indication on the display 132 that a call was missed and may only persist for a certain period of time or until the phone has been turn on and off one cycle, for example.

A missed call reminder may be created, as indicated at block 156, to remind a user to return the missed call. The missed call reminder may be set in any fashion that later indicates to a user that a communication was missed. For example, the missed call reminder may be created within the calendar application 134 of FIG. 2. The missed call reminder may be stored at the device 102 or at a computing device (not shown) located on the network 150. The missed call reminder may be set to a user customizable time or for after a set amount of time has lapsed after the call, for example. Information related to the origin of the missed call is saved with the missed call reminder and is retrieved from the data of the missed call, so that a user does not have to enter the data. This includes useful information such as the phone number and/or the identity of the caller.

When the appointed time of the reminder is reached, the reminder is actuated, as indicated at block 158, to remind the user of the missed call and facilitate the returning of the call. In one embodiment, the alarm may include providing an audible indicator (via speaker 138), a visual reminder (via display 132 or other light output device) and/or a haptic output. In another embodiment, the reminder may include a text message or a calendar reminder or a pop-up on a display, for example. The text message reminder may function simply like a text message being received by the device 102. That is, although the device 102 generates the reminder (in one embodiment) or a service provider generates the message from a network location, an audible and/or haptic alarm is actuated and the message is display like a conventional text message. In some embodiments, an automated call may be provided as the reminder with a recorded or computer generated reminder notice. In some embodiments, the call handler routine 137 (FIG. 2), the calendar application 134, and the call return routine 138 may be stored remotely from the device 102. Accordingly, the device 102 may simply be configured to, i.e., capable of receiving text messages and/or phone calls. The text messages and/or phone calls may serve as the reminders.

Upon actuation of the reminder, the display 132 may provide a menu that includes an option to return the call along with the pertinent information related to the original call, such as the phone number, the name of caller (if known) and the time and date of the original call. In one embodiment, the user may return the call by simply selecting an option from the menu.

In some embodiments, the method 150 may also include the operation of receiving a user input relative to the missed call indicator. The user input may be a touch or near touch event (i.e. proximity sensed event), for example, that occurs concurrently with the indication of the incoming call or the missed call indicator (Blocks 152 and 154) and is thus assigned to the missed call indicator. The touch or near touch event is interpreted by the device 102 as a desire to create a missed call reminder. The method 108, hence, may include creating a calendar event or timer, for example, that includes or is associated with the missed call information only after the user input is received. The method 108 may also include receiving a second user input for information pertaining to the calendaring or timing of the reminder. For example, a calendar window may be displayed and include user elements for setting a return call time and reminders. Alternatively, an adjustable timer may be provided to allow a user to set the amount of time to elapse prior to the reminder being activated.

Figure 4:
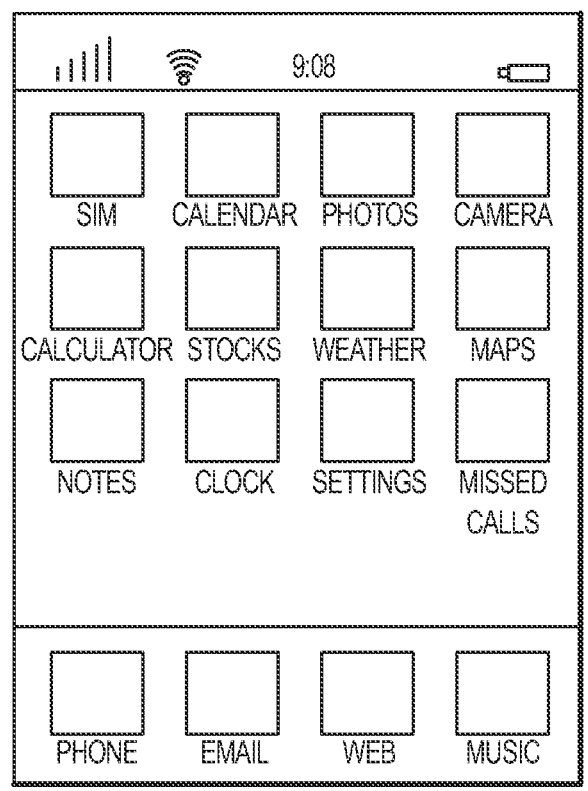
FIG. 4 illustrates an example screen shot of an electronic device configured to handle missed communications.

An example screen shot of the display 132 of the device 102 operating in a standby mode is illustrated in FIG. 4. In the illustrated embodiment, the display 132 may be a touch screen input device to allow a user to select icons representing specific functions and/or applications. As the device 102 is in a standby mode, the device 102 is displaying an example home screen with icons that may be present on a home screen including, for example, a settings icon, a clock icon, a calculator icon, etc., each opening and running a corresponding program or application if selected by the touch of a user.

An additional icon that may be shown on the home page is a missed calls icon, which when selected may open and operate a missed calls application to allow a user to view all missed calls and data related to the missed call, such as date, time, number and whether a call was returned and when. In one embodiment, the selection of the missed calls icon may launch an application that shows all missed calls. In another embodiment, selection of the missed calls icon may result in a display of only the calls for which a reminder has been set. In yet another embodiment, the selection of the missed calls icon may result in the displaying of all the call for which no reminder has been set. In another embodiment, each of the various options may be available within the missed call application.

Furthermore, selection of the missed calls icon may allow a user to customize settings related to the use of the missed calls program. For example, the user may customize the scheduling of call back reminders to certain days, certain times of the day, and/or for after a specific amount of time has lapsed. Additionally, a user may customize text message content, select type of reminder, and/or for what calls reminders should be set. For example, a user may set the missed calls program to automatically set reminders for calls originating from contacts saved in a phone book stored on the device 120 and require user approval for all other calls.

Figure 5:
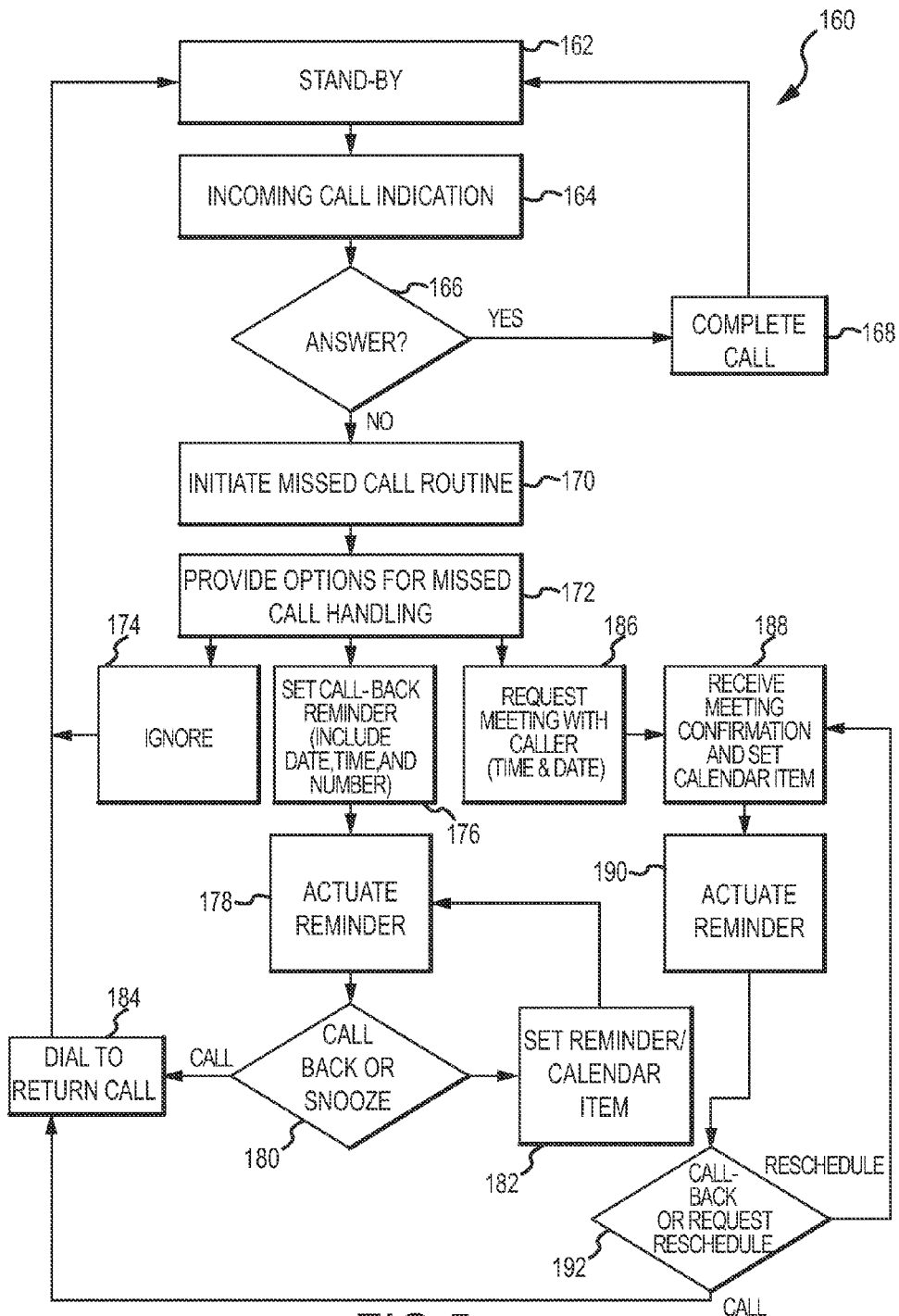
FIG. 5 is a flowchart illustrating a method of handling missed calls.
Figure 6:
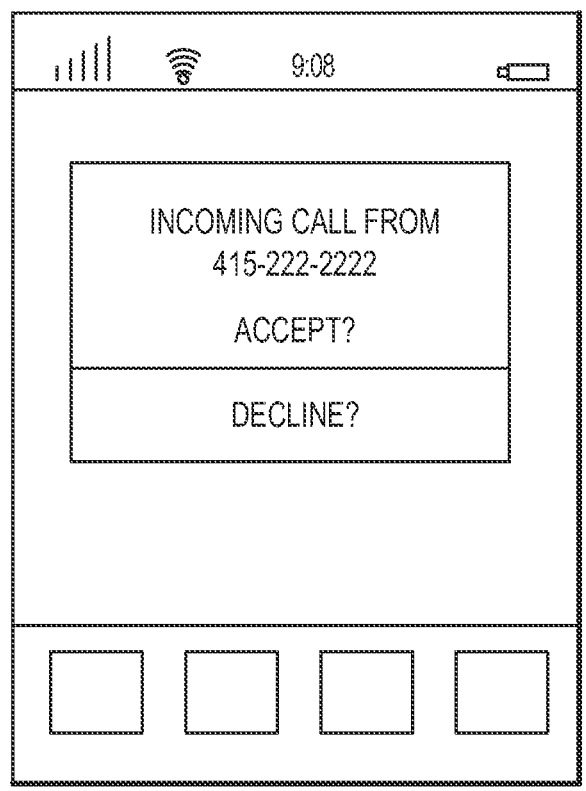

One example method of operating the communication device 102 to provide missed call reminders is illustrated in the flowchart of FIG. 5. Initially, the communication device 102 may be in a standby mode, as indicated at block 162, awaiting user input or indication of an incoming call via the network 150. Once an indication of an incoming call is received, the device 102 may indicate to a user that a call is incoming, as indicated at block 164. Typically, the indication is user configurable so that the device 102 may provide an audible ring or ringtone and/or a vibration, for example, to let a user know that a call is incoming. Additionally, the device 102 may change from the home page to display information related to the incoming call. As illustrated in the example screen shot of FIG. 6, a text box may appear on the display that states that there is an incoming call and the number that is calling. In some instances, the name of an individual associated with the number may also appear. This allows a user to decided to answer the call, as indicated at block 166, by selecting the text box or declining the call by either doing nothing or selecting a decline icon or providing other input that indicates the call is declined. If the call is accepted, two-way communication between the device 102 and another device, such as device 103, is opened via the network 150 and the call is completed, as indicated in block 168. Upon completion, the device returns to standby 160.

It should be appreciated that the device 102 may receive calls while in states other than a standby state. For example, the device 102 may be in use servicing another call or performing another function of the device 102, such as browsing the Internet. As such, standby mode may simply represent any state of operation other than receiving a particular incoming call.

If however, the call is missed or declined, the device 102 is configured to set a reminder for a user to return the missed or declined call by initiating a program for handling missed calls, such as the call reminder 136 (FIG. 2), as indicated at block 170. The missed calls program may be a program or sub-routine of a program that is launched after a call has been missed or declined. The missed calls program may provide a variety of options to a user via the display, as indicated at block 172.

Figures 7, 8:
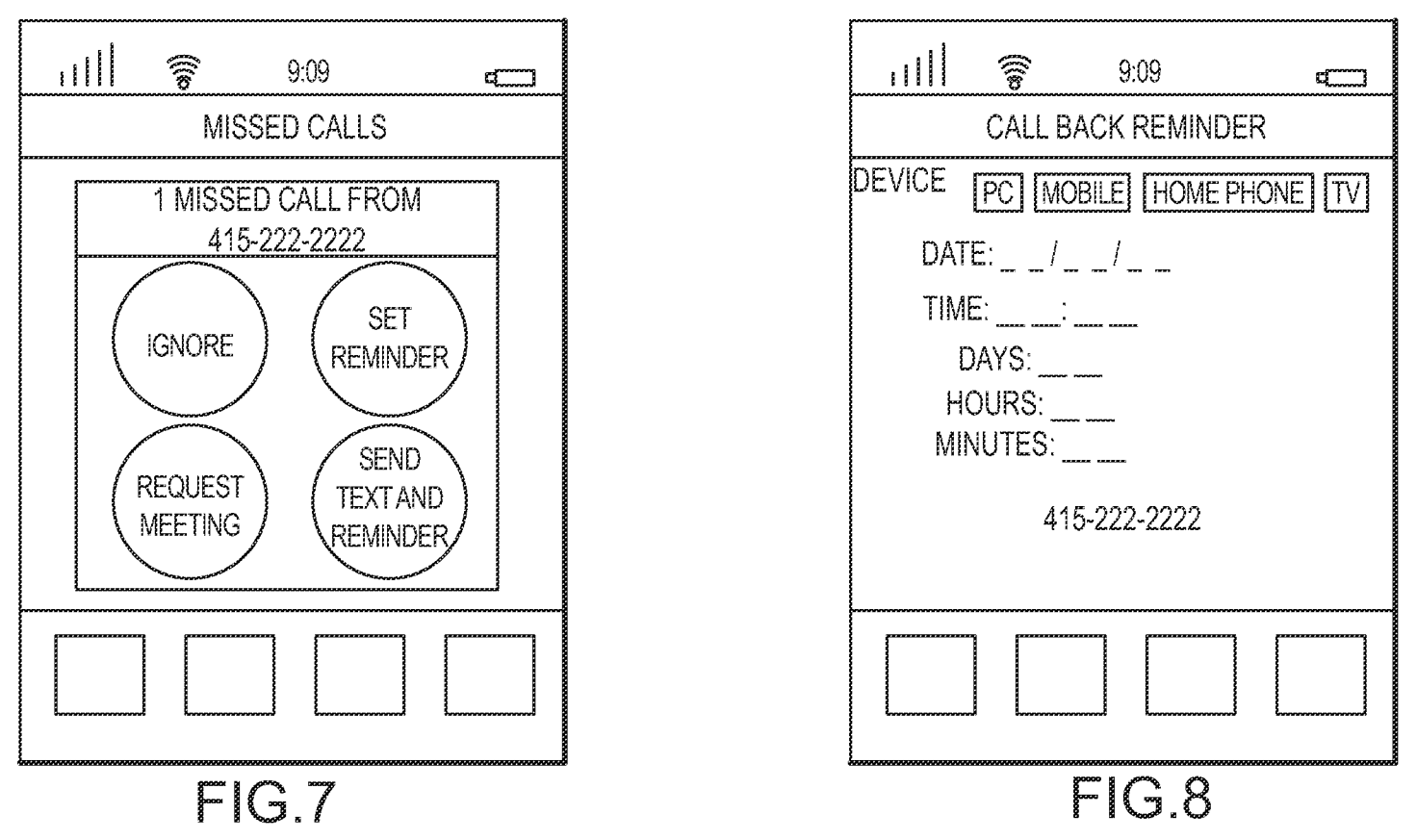

FIG. 7 is an example screenshot illustrating several possible options that the missed calls program may provide to a user. For example, as shown in FIG. 7, the missed calls program may allow a user to ignore the missed call, set a reminder, request a meeting time with the caller, or send a text and set a reminder. Should a user select to ignore the call, as indicated at block 174, the device 102 returns to a standby state 162 and does not take any further action with respect to the missed call. It should be appreciated that the screenshot illustrated in FIG. 7, as well as all the screen shots included herein, are merely examples and that an actual implementation may include more or few such screens and/or different screens with different options. As such, the screens and options provided to a user may be modified, changed and/or eliminated. Indeed, in some embodiments no visual output may be generated, as the reminder may be set automatically.

Alternatively, if the user selects one of the other options, a missed call reminder is set to remind a user to return the call. There may be a variety of missed call reminders that may be set and/or a variety of ways to set a missed call reminder. In one embodiment, the user may select the set reminder icon to be brought to a Call Back Reminder screen that allows a user to set parameters related to the call back reminder.

An example call back reminder screen is illustrated in FIG. 8 and includes user configurable parameters such as date and time at which the missed call reminder is to be displayed to the user. As an alternative to setting a date and time for the missed call reminder, other parameters may be used such as hours, minutes and days for a missed call reminder. Information relevant to returning the missed call other than the timing of the missed call reminder may be provided based on data retrieved from the missed call. Specifically, for example, the phone number originating the missed call, as well as a name associated with that number, may be stored with the call back reminder information so that it may be provided to a user at the time of the reminder.

Additionally, in some embodiments, a user may select a device for the reminder to appear on. For example, as illustrated, a user may select for the reminder to appear on a personal computer, a mobile device, or a home phone. As such, in this embodiment, the reminder may appear on a device other than the device that received the call. This may be particularly useful when a call is missed on a mobile device but the call back reminder is set for a time when a user is at home or at an office where it may be more convenient to receive the reminder on a computer or on a television, for example. The reminder may be sent from the device that received the original call or from a computer located on the communication network. As such, the reminder may be sent via a cellular network, the Internet, or a WiFi network, for example to the selected device. In one example embodiment, a smart phone may send the reminder across a home network to a computer or set top box for display on a television.

Figure 9:
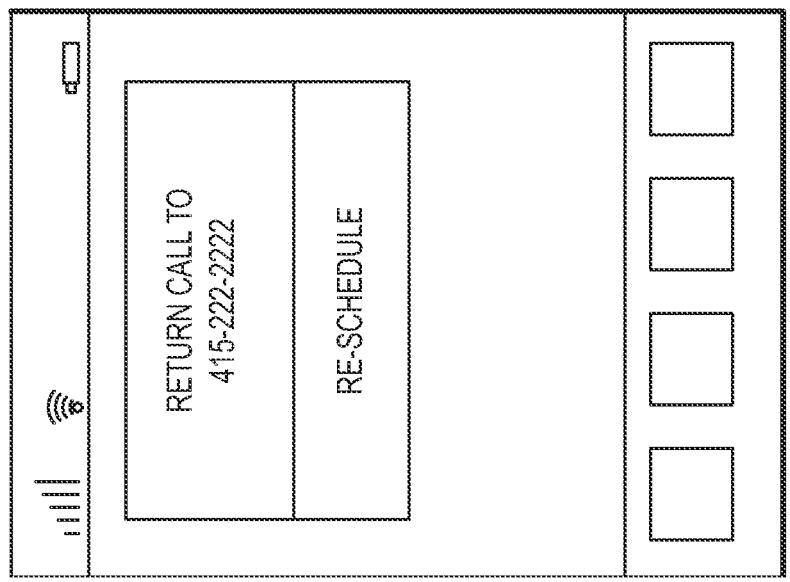

Once a call back reminder is set (FIG. 5, Block 176), the call reminder is eventually actuated, as indicated at block (178). The actuation of the call reminder may include providing an audible indication, a haptic indication and/or a visual indication of a call back reminder. An example of a visual call back reminder displayed on the screen of the device is shown in FIG. 9. The call back reminder may include a call back number to facilitate the return of the call. The call back reminder may provide one or more options to a user (FIG. 5, Block 180). In the event the call back reminder occurs at an inconvenient time, an option may be provided to allow a user to reschedule the reminder (Block 182). The rescheduling of the call back reminder may include setting a particular time and day or after a set amount of time has elapsed and, as such, a screen such as that illustrated in FIG. 8 may be provided to a user.

Alternatively, a user may elect to return the call by selecting Return Call (FIG. 9). In a touch screen embodiment, the user may simply touch a block or icon within the visual reminder to return the call, as all the information (i.e. phone number) is stored with the reminder. Hence, upon selection to return the call as prompted by the reminder, the device will place a call (FIG. 5, Block 184).

Figure 10:
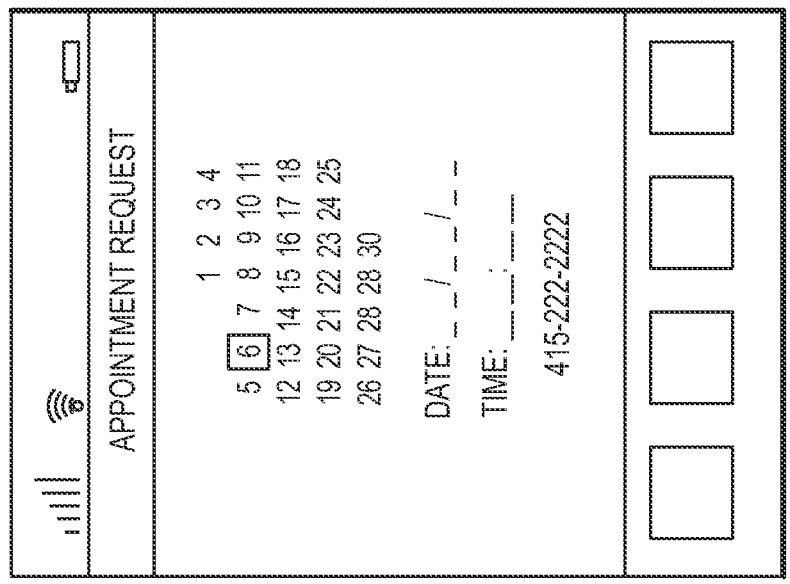
Figure 11:
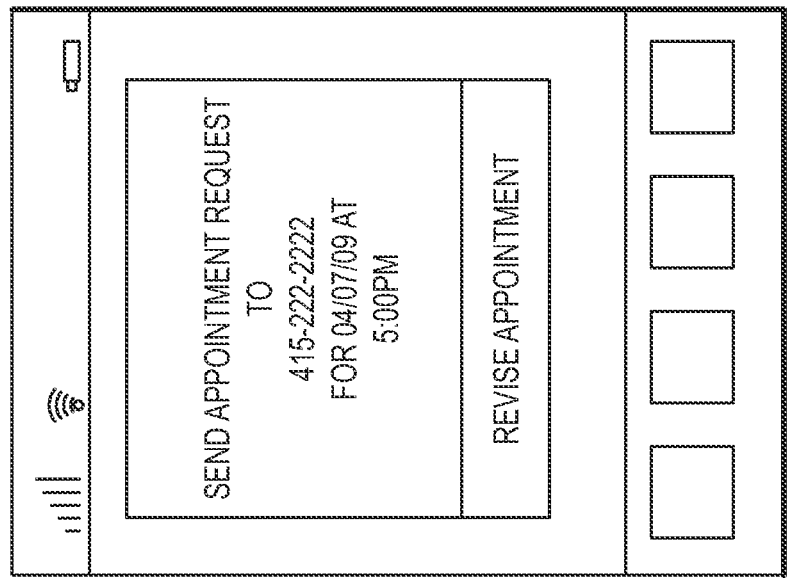

In an alternative embodiment, the device may be configured to provide a user with the option of requesting an appointment with the caller, as indicated at block 186. As such, for example, if 102 missed a call from 103, device 102 would allow a user of 102 to select to send a meeting request to device 103. The device 102 may allow a user to set time and date information for the meeting request. FIG. 10 illustrates an example screen shot for setting of parameters related to requesting a meeting. Specifically, the screen may include a reference calendar indicating the date of the missed call. For example, the date of the call may be indicated by a box around a date in the calendar. A user may set the date and time requested for the meeting. In other embodiments, the user may also, or alternatively, set an amount of time, such as one hour, for example, to elapse before the meeting. Once the fields have been completed, the device may provide a confirmation screen to allow a user to review the information related to the meeting request. FIG. 11 illustrates an example of a confirmation screen for device 102. If all the information is correct, the user may select to send the appointment request and the request may be sent to the number associated with the missed call. Alternatively, if there are errors in the meeting request, the user may elect to revise the meeting request, in which case, the user will be returned to the meeting request screen to make corrections before confirming and sending the meeting request.

Figure 12:
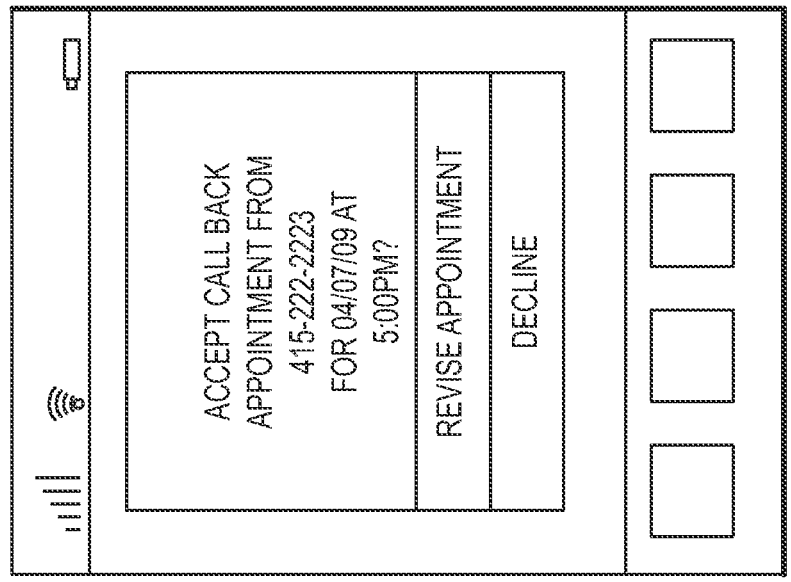

The original caller will receive the meeting request and may then elect to confirm, modify or decline the request. FIG. 12 illustrates and example screen shot that may be associated with a received meeting request. As can be seen, a user may select to accept the meeting request as sent, revise the meeting, or decline the meeting. When one of the options is selected a response may be generated and sent back to the device that requested the meeting. In some embodiments, when a meeting request is accepted a calendar event is logged on the accepting device with an associated reminder. Thus, a reminder may be provided similar to the screen illustrated in FIG. 9, except it will include the information for the number associated with the user that requested the meeting.

Referring again to FIG. 5, if a meeting confirmation is received, the meeting time and date are saved as a calendar item so that a reminder may be set, as indicated at block 188. When the time and date of the meeting are reached, the reminder may be actuated (Block 190) and a user may select to keep the meeting by returning the originally missed call or requesting to re-schedule the meeting, as indicated at block 192. If the user selects to re-schedule the appointment, the user may again input time and date parameters for the meeting and send the request (i.e. FIGS. 10 and 11). Although certain operations are discussed with respect to certain elements of a device or particular devices, it should be appreciated that these statements are intended as examples only. In alternative embodiments, other hardware or elements may be used to perform one or more operations disclosed herein.

In one embodiment, upon selecting to return the call, the device 102 returns the call to the number associated with the missed call. In another embodiment, the device 102 may provide options for the call back. For example, if the number associated with the missed call is a number included in a directory such as a phone book stored in a memory 126 of the device 102 and is associated with a contact listed in the directory that has multiple phone numbers (i.e. home, office, mobile, etc.), the device 102 may provide alternative calling options to a user for returning the call. This option may be particularly useful when the meeting has been set for a different time of day or a different day. For example, the original call may have been placed during business hours (e.g. 9:00 am and 5:00 pm) and the meeting may be set for a time outside business hours (e.g. 6:30 pm). Thus, a user may select a number that would be most convenient or increase the likelihood of reaching the intended individual. In some embodiments, a user may provide a preferred number for the meeting when requesting the meeting, confirming the meeting or accepting the meeting request. Additionally, in some embodiments, the device 102 may be configured to determine the time zone of the caller and suggest a time that might be convenient for both parties. For example, in one embodiment, the device 102 may be configured to determine the location of the caller based on the area code of the device originating the call. If the call originates from a time zone different from the time zone of the device 102 (which may be determined based on the area code associated with the device 102, for example), the device 102 may be configured to provide a reminder of the time difference and or suggest a time that would be during the daytime hours for both the caller and the user of the device 102. In one example, the device 102 located in California missed a call from New York and suggests a time of 6:00 PM (9:00 PM in New York) for returning the call rather than 9:00 PM (12:00 AM in New York).

If a user selects to keep the meeting and return the call, the device 102 may automatically dial the number of the missed call to return the call, as indicated at block 184. Upon completion of the call, the device 102 returns to the standby state (Block 162). In some embodiments, if the call back fails (i.e. no answer or voice-mail, etc.), a new reminder (not shown) may be set by the user or according to settings preset by a user or by the device. For example, in the event a returned call fails, the device may automatically set a reminder (or repeat the previous reminder) after a period of time has lapsed, such as 10 minutes.

Figure 13:
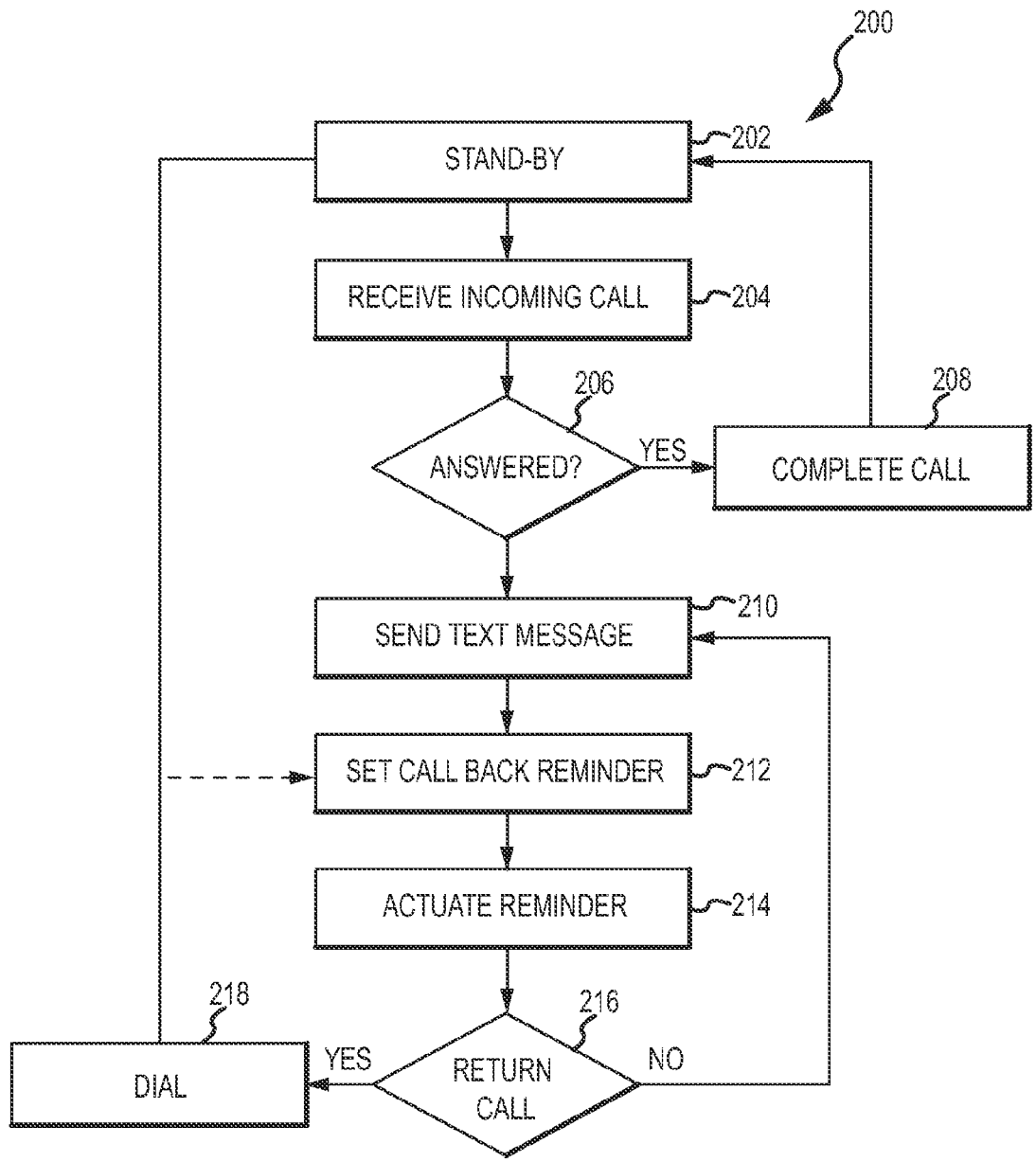
FIG. 13 is yet another flowchart illustrating a method of handling missed calls.

FIG. 13 is a flow chart illustrating a method 200 of operating a device 102 in accordance with yet another alternative embodiment. Specifically, the method 200 includes sending a text message response when a call is missed and setting a call back reminder. Initially, the device 102 may be in a standby state (Block 202). Upon receiving an incoming call (Block 204), the device 102 determines whether the call has been answered (Block 206). If answered, upon call completion (Block 208) the device 102 returns to a standby state (Block 202).

If, however, the call is not answered and the call is missed, the device 102 may send a text message response to the caller (Block 210). The text message may include preprogrammed content or user customized content. For example, the text message may include a generic statement such as, "Sorry I was unable to take your call. I will return your call at my earliest opportunity." Alternatively, a user may be prompted to provide content for the text message upon receiving indication that the call has been missed. For example, referring back to FIG. 7, one possible option for missed call handling includes sending a text message. Thus, a user may further explain why the call was missed and/or when the call will be returned. In another embodiment, a user may provide content for text messages that will be send automatically to numbers that are included in a directory or phonebook listing stored on the phone. Further, the text may indicate a general time when the call will be returned. For example, a particular user may have availability at a certain time each day to return phone calls. The user may provide that time in the content of a text message that will automatically be sent to the caller.

In addition to sending a text message, the device 102 may set a call back reminder (Block 212). The setting of the call back reminder may include receiving user input to set the time, as discussed with reference to other embodiments. Alternatively, the call back reminder can be set to periodically actuate until an action is taken to either return the call or dismiss the call back reminder. For example, the call back reminder can be set to actuate ten minutes after the call was missed, once every hour, or once a day.

Once the reminder has been set, it will actuate at the appointed time or after the set amount of time has lapsed (Block 214). The actuation of the reminder may include one or more of a visual reminder (via display 132, for example), an audible reminder (via speaker 138), and a haptic reminder. In some embodiments, the type and frequency of the reminder may be set by the user. That is, a user may set the call back reminder to include a particular chime, for example, and may set the reminder to repeat every ten minutes after its actuation.

The reminder will prompt a user to return the call (Block 216). If the user chooses to return the call, the device 102 will dial the number associated with the missed call (Block 218). If the call is completed, the device 102 will return to a stand by state (Block 202). In one embodiment, if the call is attempted but is unsuccessful, the device may allow a user to set another call back reminder (Block 212). Alternatively, the call back reminder may automatically set a reminder for a set period of time, such as ten minutes, or for the same period that was used for the original reminder, for example. In yet another embodiment, upon attempting to return the call, the reminder may be dismissed, even if unsuccessful. A user may be provided the ability to set the device to operate in accordance with his or her preferences in this regard.

If a user decides to not return, or attempt to return the call, as the case may be, the user may be prompted to set another call back reminder (Block 212). In an alternative embodiment, declining to return the call after a reminder will dismiss the reminder entirely. In yet another embodiment, declining to return the call after the reminder will automatically result in another reminder being scheduled. As above, the re-scheduled reminder may be for a set period that may be preprogrammed during manufacture or by a user.

It should be appreciated that the specific embodiments described herein are provided merely as examples and are not to be construed as limiting the scope of the disclosure. As such, specific embodiments may be combined, parts of the embodiments may be combined or may be severed from the particular embodiments and taken alone. For example, in one embodiment, a text message may be sent after a missed call without setting a call back reminder. In one embodiment, the sent text message may serve as a reminder to the caller to call back at a certain time, for example. Additionally, the disclosure is not intended to be limited to mobile telephony. Rather, the techniques may be applied to fixed telephony systems located in homes and/or offices including plain-old telephone systems, VoIP systems, etc. As such, all alternative and variant embodiments not explicitly described herein are believed to fall within the scope of the present disclosure.

The invention claimed is:

1. A method for providing missed communication reminders comprising:
   receiving, by an electronic device, an electronic communication from a caller;
   determining, by the electronic device, that the electronic communication was not acknowledged;
   in response to determining that the electronic communication was not acknowledged, creating a missed communication reminder, the missed communication reminder scheduled to be actuated automatically at a certain time, wherein the missed communication reminder is scheduled to be actuated on a device selected from among a plurality of devices associated with the called party;
   storing the missed communication reminder in an electronic storage medium associated with the electronic device; and
   upon reaching the certain time, actuating the missed communication reminder on the selected device.

2. The method of claim 1 comprising retrieving origin identifying information and storing the information with the missed communication reminder.

3. The method of claim 1 comprising receiving user input relative to the missed communication indicator indicating a missed communication reminder is to be created and only creating the reminder if the user indicates a missed call reminder is to be created.

4. The method of claim 3 wherein receiving user input comprises sensing user touch input.

5. The method of claim 4 wherein the user input relative to the created missed communication reminder comprises at least one of a date, a time of day or a time period.

6. The method of claim 1 wherein the missed communication reminder is an alarm associated with a calendar application executing on the electronic device.

7. The method of claim 1 comprising sending a meeting request to a number associated with the missed communication.

8. The method of claim 1, further comprising:
   after termination of the electronic communication, sending a text message to a number associated with the missed communication, wherein the text message includes automatically generated content and is sent without user input, wherein the automatically generated content includes a customized message, wherein the customized message is stored in memory and is automatically determined based on the caller.

9. An electronic communication device comprising:
   a processor;
   a memory coupled to the processor, the memory storing operating instructions for the electronic communication device; and
   a plurality of I/O devices coupled to the processor, the plurality of I/O devices comprising:
      at least one device configured to receive and transmit electronic communications;
      at least one device for receiving user input; and
      at least one device for providing output to a user;
   wherein the electronic communication device is configured to:
      determine when a communication is not acknowledged;
      store information related to the communication in the memory of the electronic communication device, the information comprising date, time and origin of the communication; and
      set a reminder comprising the information related to the communication, the setting of the reminder comprising:
         setting a time for actuation of the reminder; and
         selecting a device on which the reminder will be actuated from among a plurality of devices associated with the called party.

10. The electronic device of claim 9 wherein the electronic communication device is configured to receive user input related to the setting of the reminder.

11. The electronic device of claim 9 wherein the electronic communication device is configured to automatically set the time and date of the reminder.

12. The electronic device of claim 9 wherein the at least one device for providing output comprises at least one of a speaker, a display, or a haptic actuator, the at least one device for providing output being actuated by the reminder when the time for the reminder is reached.

13. The electronic device of claim 9 wherein the at least one device for receiving user input comprises at least one of a push button, a touch sensitive display, a keyboard, a proximity sensor, a microphone, a mouse, or a trackpad.

14. The electronic device of claim 9 wherein the at least one device configured to receive and transmit electronic communications comprises one or more of a cellular antenna, a WiFi antenna, an Ethernet port, a phone jack, or a Bluetooth antenna.

15. The electronic communication device of claim 9,
    wherein the electronic communication device is configured to:
       send a message to a number associated with the missed communication, the message customized in the event that a customized message stored in memory is associated in memory with the number.

\* \* \* \* \*